Nov. 25, 1969　　　W. E. JUREIT　　　3,480,305
BOLT-HOLE REINFORCING PLATE
Filed June 26, 1967
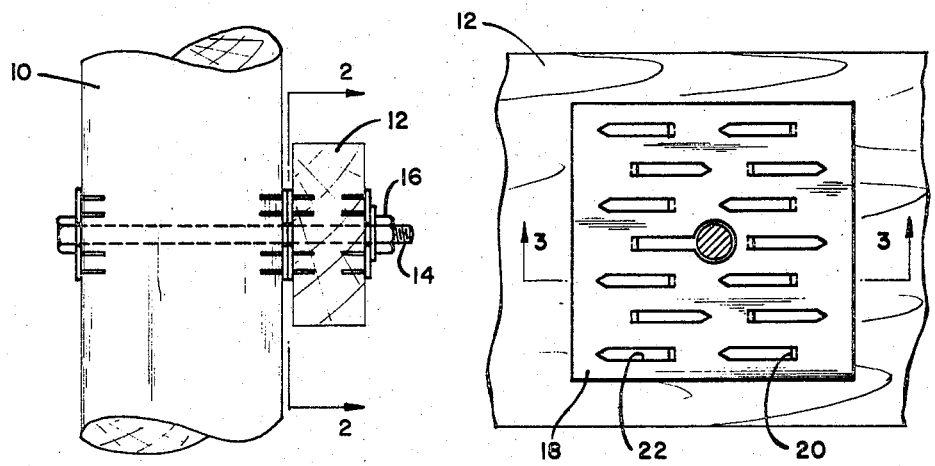
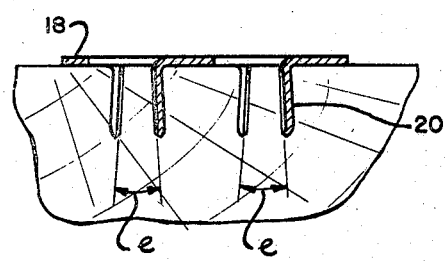
FIG. 3
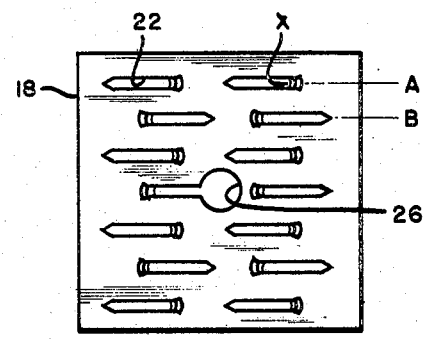
FIG. 4
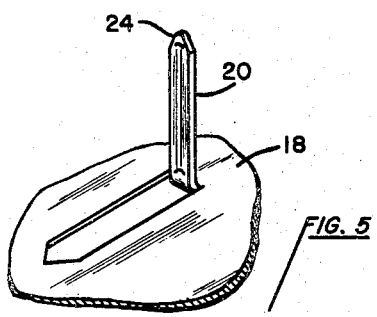
FIG. 5
INVENTOR
WILLIAM E. JUREIT
BY  *Le Blanc and Shur*
ATTORNEY

United States Patent Office 3,480,305
Patented Nov. 25, 1969

3,480,305
BOLT-HOLE REINFORCING PLATE
William E. Jureit, Miami, Fla., assignor to Automated Building Components, Inc., Miami, Fla., a corporation of Florida
Filed June 26, 1967, Ser. No. 648,848
Int. Cl. F16b 5/00, 7/00, 9/00
U.S. Cl. 287—20.92                              3 Claims

ABSTRACT OF THE DISCLOSURE

The reinforcing plate comprises a plurality of nail-like teeth struck therefrom for embedment into a wooden member and a central opening for receiving a bolt passing through adjoining structural members whereby stress concentrations acting on the wooden bore hole are borne by the plate and distributed by the teeth to the area surrounding the bore hole opening. A like reinforcing plate may be embedded into the adjoining wooden member with the bolt passing through a central opening therethrough locating the plates in back-to-back relation at the joint interface whereby stress concentration acting on both bore holes are distributed through the plates and teeth thereof to the areas about the bore holes. Like plates for like purposes are provided at opposite ends of the bolt.

BACKGROUND OF INVENTION

This invention relates to joints for wooden structural members and particularly to bearing plates for reinforcing bolted joints.

Structural load-bearing members are often joined by passing a bolt through a bore hole provided through each of the structural members and securing the bolt as by a nut threaded onto the end thereof. While this fastening method provides a secure joint, problems have arisen in instances where one or more of the structural members comprises a wooden member. The loading transferred from the bolt to the wooden member acts to work the bolt and concentrate the loading against the wood fibers which form the surface of the bore hole.

For example, in the public utilities industry, the crossarms on telephone and electric poles or the like are secured to the poles by passing and securing a bolt through both the crossarm and the pole. The entire load of the crossarm and wires carried thereby as well as the live and variable load contributed thereto by environmental conditions such as wind, ice, snow, and the like, is borne by the through bolt and in turn by the adjacent wood fibers forming the bore hole. Swaying of the pole, crossarm, and wires due to this variable load works and wears such adjacent wood fibers to the extent that the bore hole is generally enlarged over a period of time thereby loosening the joint and splitting the wooden members. Specifically, the swaying action of the crossarm compresses the wood fibers about the bore hole and concentrates the stress particularly against those fibers adjacent the interface of the crossarm and pole causing the fibers to wear and split, gradually enlarging the bore holes adjacent the latter's adjoining end portions. Undesirable stress concentrations and increased free play between the crossarm and pole as well as additional inertial loading resulting from the free play are thus introduced and may load the joint beyond its breaking point.

SUMMARY OF INVENTION

The present invention provides a structural joint having one or more load bearing plates located at the interface of the structural members. Each plate is of the type having a plurality of slender, elongated nail-like teeth projecting from a side face thereof for embedment into one of the wooden structural members. The bearing plate also has a central opening for receiving a through-bolt. With a plate thus embedded and a bolt passing through the adjoining wooden members, the bolt bears against the metal plate portion about the opening in the plate and the normal wearing action of the bolt against the adjacent wooden fibers or conversely the fibers against the bolt, is precluded. The load-bearing forces previously applied against the wood fibers, instead of being concentrated and localized at a point immediately adjacent the end fibers of the bore holes, are redistributed by the reinforcing plate of the present invention to areas of the wood fibers surrounding the bore hole. The plate loading is transferred into the teeth embedded into the wooden member and thus distributed over a wide area of the wood fiber by the spaced teeth with each tooth loading its adjacent wooden fiber a proportion of the total plate loading corresponding to the number of teeth per plate. Large stress concentrations which tend to compress and wear the wood fiber at localized points adjacent the bore hole openings are thus avoided. Further, due to the relatively elongated nature of the teeth, the stresses are carried well into the wood and the teeth act as true nails rather than conventional shear teeth which merely interact with the surface of the wood.

In one form of the present invention, a pair of reinforcing plates are embedded into the adjoining wooden structural members such that the faces of the plates on the sides thereof opposite the sides from which their respective teeth project, abut in back-to-back relation providing a planar bearing surface, the bolt holding the plates in back-to-back relation. In this manner, load applied to the plates by the bolt is distributed to the wood fiber of both structural members forming the area surrounding the embedded teeth. In addition, reinforcing plates of this type may also be applied at opposite ends of the bolt, thus further distributing the loading. Moreover, by forming bore holes in each wooden member with diameters slightly larger than the diameter of the bolt and applying the four plates, each having smaller diameter openings than the bore diameter, coaxially, the bolt per se would not bear against the wood fibers and all loading would be distributed over the areas of each of the wooden members in which the teeth are embedded.

Accordingly, it is a primary object of the present invention to provide an improved reinforced bolted joint for load bearing wooden structural members.

It is another object of the present invention to provide an improved bolted joint for wooden structural member including a bearing plate having a plurality of nail-like teeth struck therefrom for distributing the load to areas of the wooden members spaced from and surrounding the bolt holes.

It is still another object of the present invention to provide an improved bolted joint for wooden structural members having a reinforcing plate providing a bearing surface against which the bolt acts to preclude wearing of the wooden fibers forming the bore holes and to avoid stress concentrations at localized points in the bore hole.

It is a further object of the present invention to provide a reinforced bolted joint particularly adapted for use in the public utilities industry for securing crossarms to utility poles whereby relative movement between the poles and arms is effectively resisted without damage to the wood poles and crossarms and without otherwise impairing the effectiveness of the joint.

DESCRIPTION OF DRAWINGS

FIGURE 1 is a fragmentary elevational view of the bolted joint formed in accordance with the present invention as applied to a utilities crossarm and supporting pole;

FIGURE 2 is a fragmentary sectional view thereof taken on line 2—2 of FIGURE 1 and illustrating the reinforcing plate as applied to the crossarm;

FIGURE 3 is a fragmentary sectional view thereof taken on line 3—3 of FIGURE 2;

FIGURE 4 is a plan view of the reinforcing plate looking down onto the teeth struck therefrom; and FIGURE 5 is a fragmentary view illustrating a tooth struck from the reinforcing plate.

DESCRIPTION OF PREFERRED EMBODIMENT

Referring to FIGURE 1, there is shown a pair of wooden structural members 10 and 12, joined together as by the passage of a bolt 14 through suitable bore holes provided centrally through each member and finally secured together by a nut 16. In the illustrated form, wooden members 10 and 12, respectively, comprise a supporting pole having a circular cross section and a cross arm which is adapted to carry the telephone or electric wires in the usual manner by means not shown and it is apparent that the entire dead load of the crossarm and the wires as well as any additional loading provided by wind, snow, ice, and other environmental conditions is borne by bolt 14 and in turn by the wood fibers directly adjacent thereto forming the bore holes.

To avoid stress concentrations on the contiguous wood fibers about the bore holes and to distribute the load borne by the bolt, bearing plates 18 are provided and, as best seen in FIGURE 4, each comprises a flat, rectangular plate, preferably formed of 14 gauge U.S. standard sheet metal, such as galvanized steel, having a plurality of slender, elongated, nail-like teeth 20 struck to project from a side face thereof. Teeth 20 are struck as to leave narrow, elongated slots 22 arranged in spaced side-by-side relationship in a plurality of longitudinally extending rows, for example, rows A and B, seen in FIGURE 4. Teeth 20 are struck so that the slots 22 in adjacent longitudinal rows extend from the teeth in opposite longitudinal directions. The slots 22 in each longitudinally extending row thereof are staggered relative to their next adjacent longitudinally extending rows such that the teeth 20 struck in each longitudinal row are approximately transversely aligned with the medial portion of the slots of the next adjacent longitudinal row. In this manner, teeth 20 are optimally spaced to provide maximum strength and high tooth density for a given area and for a given quantity of sheet metal. While only seven longitudinal rows of teeth are illustrated, each row having two teeth, it will be understood that a larger number of rows having additional teeth per row could be provided and that the number of teeth and number of rows thereof herein illustrated is by way of example only, although fewer rows than five having two teeth per row would impair the effectiveness of the load bearing plate.

As best seen in FIGURE 3, the teeth in each longitudinal row are struck to an angle slightly greater than 90° and it will be seen that the corresponding teeth in the next adjacent rows diverge one from the other at a very slight angle indicated at e. While the teeth are nail-like in form and offer high withdrawal resistance properties similarly as nails, striking the teeth to angles slightly greater than 90°, particularly with corresponding teeth in adjacent longitudinal rows being struck in opposite directions, provides for a substantial increase in the withdrawal resistance of the plate from the wooden structural member. Note also, that the teeth are slightly arcuate in cross section and are struck preferably to a length at least eight times the thickness of the plate, thus strengthening the teeth and providing substantial resistance to bending upon embedment into a wooden member. The teeth are struck as to form pointed ends 24 leaving a V-configuration in one end of the slots whereby the teeth may be readily and easily embedded into the wooden structural members.

A circular opening 26 is provided through the central portion of plate 18. It will be noted that opening 26 is also provided through an end portion of a slot 22 formed in the central longitudinal row of slots, the end portion being remote from the tooth struck from such slot. Due to the staggered arrangement of the struck teeth in adjacent longitudinal rows, opening 26 can be formed through plate 18 without eliminating one or more of the teeth struck therefrom and still have a preferred diameter greater than the transverse centerline-to-centerline distance of the slots in the next adjacent rows. Accordingly, the tooth density over the surface of the plate remains the same throughout such surface whereby the withdrawal resistance of the plate and the shear strength of its teeth are maintained notwithstanding the formation of opening 26 centrally of plate 18.

As an illustrative example of the foregoing plate construction, it has been found that a plate formed of 14 U.S. standard gauge (nominal thickness .0747 inch) sheet steel, on the order of 2⅝ inches square, and having seven longitudinal rows of teeth with two teeth per row, provides an effective load bearing plate. The length and width of the teeth, in this example, are approximately .625 and .145 inch, respectively, while the spacing between teeth in the next adjacent longitudinal rows thereof from centerline to centerline is approximately .374 inch and the spacing between the near ends of adjacent slots in each row is about .480 inch.

Referring again to FIGURE 1, bearing plates 18 may be applied to pole 10 and crossarm 12 at the factory or job site as desired such that central openings 26 are in registry on opposite sides of the structural members 10 and 12 with the bore holes opening therethrough. Particularly the opening 26 through each plate is aligned with the bore hole opening through its associated structural member and the teeth embedded in the wooden surface surrounding the bore hole as by machine pressing or manually driving the teeth into the associated wooden member. Crossarm 12 may then be secured to pole 10 by passing bolt 14 through its bore hole and the openings 26 in the plates 18 embedded about opposite ends of its bore hole and through the bore hole in crossarm 12 and the openings 26 in its associated plates embedded about the bore hole openings on opposite side faces of crossarm 12. Nut 16 is applied and tightened on bolt 14 and crossarm 12 is thereby secured to pole 10.

In this manner, the outer flat faces of the plates 18 between pole 10 and crossarm 12 and forming the interface thereof, abut one against the other in back-to-back relation and effectively preclude lateral swaying of crossarm 12 relative to pole 10. Bolt 14 bears against the metal portions of plates 18 surrounding openings 26 and loading applied to the pole or crossarm 12 is transmitted by the structural members directly to the plates 18 or by bolt 14 directly to the plates 18. This loading is distributed over the entire area of plates 18 and distributed to each of the teeth struck therefrom. In this manner, the loading, instead of being concentrated at localized points in the wood fibers adjacent the bore hole openings, is distributed throughout the wood fibers in which the teeth of the plates are embedded.

For example, if a large downward load is applied to crossarm 12 as by the formation of snow or ice or the like on the wires (not shown) carried thereby, such load would normally be transmitted to and borne by the wood fibers forming the bore hole in pole 10, particularly those fibers adjacent the end of the bore hole on pole 10 nearer crossarm 12. Such load would likewise press crossarm 12 downwardly onto bolt 14 such that the wood fibers forming the bore hole of crossarm 12, particularly those fibers forming the upper side of the bore hole, would bear the entire load. However, by applying plates 18 as hereinbefore described and illustrated at the interface of pole 10 and crossarm 12, the load would be distributed over the area of plates 18 to their associated teeth whereby the entire load would be distributed to the wooden areas surrounding each of the bore hole openings through poles 10 and 12. In this manner, load concentration, which would normally compress and destroy the wooden fibers at localized points about the bore holes, is avoided and the entire load is distributed throughout a wide area of the wooden members by the teeth whereby the load applied by each tooth to its adjoining wooden fiber is minimal and approximately proportional to the load as the number of teeth in the plate. Note also that if the bore holes are formed having a diameter larger than the diameter of bolt 14 and plates 18 are thus applied, the adjacent wooden fibers defining the bore holes would remain out of contact with bolt 14 and the loading applied from one structural member to the other would be transferred only through the teeth of the reinforcing plates 18.

While the illustrated form of the present invention employs four reinforcing plates, it is obvious that in certain applications, only one or more can be employed. For example, if a metal member is bolted to an adjoining wooden structural member, only a single plate 18 need be embedded into the wooden member on the side thereof forming the interface of the wooden member and metal member. The loading would then be transferred from the metal member to the bolt and to the plate 18, the load being distributed by teeth 20 as before to the wooden area surrounding the bore hole opening. This type of reinforced bolted joint is effective to avoid stress concentrations in the wooden member and only the one plate 18 is needed to practice the present invention. However, in most applications, I prefer to employ two reinforcing plates 18 located at opposite ends of the bore hole for each wooden adjoining member such that stress concentrations along the full length of the bore hole can be avoided.

The crossarms 12 of utility poles 10 are normally provided with cross bracing to prevent rotation of the crossarm about the bolt axis and the plates 18 herein illustrated are particularly adapted for use with such externally supported crossarms. However, where the crossarms are not otherwise supported, it would be possible to provide serrations, grooves, and the like (not shown) on the flat back faces of plates 18 whereby, in tightening down nut 16 on bolt 14, corresponding serrations, grooves or the like on each of the plates 18 forming the interface of the pole and crossarm would mate thereby to effectively preclude rotation of the crossarm 12 relative to pole 10.

It is therefore apparent that the objects of my invention are fully accomplished in that there is provided an improved bolted joint for wooden structural members which precludes stress concentrations on the wooden fibers and distributes the load to areas of the wooden members spaced from and surrounding the bolt holes and their openings. Moreover, the reinforcing plates are inexpensive, easily applied either in the field or at the factory, and are effective to significantly prolong the wear life of the adjoining wooden members.

The invention may be embodied in other specific forms without departing from the spirit or essential characteristics thereof. The present embodiments are therefore to be considered in all respects as illustrative and not restrictive.

What is claimed and desired to be secured by United States Letters Patent is:

1. A structural joint comprising a pair of adjoining structural members having bore holes formed therethrough, each of said members being formed of wood, a sheet metal plate having a central opening and a plurality of slender, elongated nail-like teeth struck therefrom to project outwardly from a side face thereof, said teeth being substantially constant in width throughout substantially their full length and having a length to width ratio of at least 4 to 1, said teeth being struck to form a plurality of spaced longitudinal rows having no fewer than two teeth per row, said teeth in each row being struck in the opposite direction from the teeth in the next adjacent rows such that the slots formed thereby in each row extend from their teeth in a direction opposite to the direction the slots in the next adjacent rows extend from their teeth, said plate being secured to said one structural member with the teeth thereof being embedded in a side of said one structural member about an end of its associated bore hole such that said opening in said plate and said bore hole register one with the other, bolt means passing through said bore holes in the adjoining structural members and through the opening in said plate, thereby securing said structural members together such that said plate opening defines a fixed bearing for said bolt, said joint including another sheet metal plate having a central opening and a plurality of slender, nail-like teeth struck therefrom to project outwardly from a side face thereof, said teeth being substantially constant in width throughout substanially heir full length and having a length to width ratio of at least 4 to 1, said teeth being struck to form a plurality of spaced longitudinal rows having no fewer than two teeth per row, said teeth in each row being struck in the opposite direction from the teeth in the next adjacent rows such that the slots formed thereby in each row extend from their teeth in a direction opposite to the direction the slots of the next adjacent rows extend from their teeth, said other plate being secured to said other of said structural members with the teeth thereof being embedded in said other structural member about an end of its associated bore hole such that said latter opening and bore hole register one with the other, said bolt means passing through the opening in said other plate such that the faces of said plates on the side thereof opposite their respective teeth abut one with the other, the other plate opening defining a fixed bearing for said bolt, said teeth being uniformly distributed throughout each of said plates, each of said plate openings having a diameter greater than the transverse centerline-to-centerline distance of the slots in next adjacent rows thereof, each of said plate openings being formed to intersect one of said slots adjacent the end thereof opposite its associated tooth whereby tooth density remains a constant over the area of the plate.

2. A structural joint according to claim 1 wherein said teeth are struck at an angle slightly greater than 90° thereby effectively increasing their withdrawal resistance from the structural members.

3. A structural joint according to claim 1 wherein said plates are formed of 14 U.S. standard gauge sheet metal and said teeth have a length at least eight times the thickness of said sheet metal.

References Cited

UNITED STATES PATENTS

| | | | |
|---|---|---|---|
| 409,546 | 8/1889 | Zeigler | 287—20.92 |
| 3,016,586 | 1/1962 | Atkins | 287—20.92 |
| 3,362,277 | 1/1968 | Moehlenpah et al. | 85—13 |
| 2,762,091 | 9/1956 | Jenne | 287—20.92 |
| 2,877,520 | 3/1959 | Jureit | 85—11 |

FOREIGN PATENTS

| | | |
|---|---|---|
| 750,602 | 1/1967 | Canada. |
| 128,555 | 1920 | Great Britain. |
| 314,864 | 8/1956 | Switzerland. |
| 1,409,786 | 7/1965 | France. |

EDWARD C. ALLEN, Primary Examiner